United States Patent [19]

Talwar

[11] Patent Number: 5,117,505
[45] Date of Patent: May 26, 1992

[54] INTERFERENCE CANCELLATION SYSTEM HAVING NOISE REDUCTION FEATURES AND METHOD

[75] Inventor: Ashok K. Talwar, Westlake Village, Calif.

[73] Assignee: American Nucleonics Corporation, West Lake Village, Calif.

[21] Appl. No.: 483,543

[22] Filed: Feb. 22, 1990

[51] Int. Cl.⁵ .................. H04B 1/06; H01Q 21/00
[52] U.S. Cl. .................. 455/278.1; 343/853
[58] Field of Search .............. 455/278, 272, 136, 273, 455/277; 343/713, 841, 853

[56] References Cited

U.S. PATENT DOCUMENTS 3,699,444 10/1972 Ghose et al. ..................... 325/21
4,864,642 9/1989 Ueno ............................... 455/278

OTHER PUBLICATIONS

"Collocation Of Receivers And High-Power Broadcast Transmitters, IEEE Transactions On Broadcasting", vol. 34, No. 2, Jun. 1988.

Primary Examiner—Curtis Kuntz
Assistant Examiner—Christine K. Belzer
Attorney, Agent, or Firm—Hoffmann & Baron

[57] ABSTRACT

An interference cancellation system automatically couples and decouples intself from a radio receiver system when no interfering signals are present. The interference cancellation system, which is adapted to be connected to the radio receiver system having a receiver antenna, a receiver and a receiver transmission line interconnecting the receiver antenna and the receiver, includes an auxiliary antenna, a first directional coupler connected to the auxiliary antenna, a second directional coupler connected to the receiver transmission line, a third directional coupler connected to the first directional coupler, a synchronous detector connected to the third and second directional couplers, a signal controller connected to the synchronous detector and a subtractor connected to the receiver transmission line and to the signal controller. A detector is connected to the third directional coupler, and a comparator is connected to the detector and is provided with a predetermined threshold voltage level. The comparator compares the detected output signal from the detector with the predetermined threshold voltage level, and provides an output signal to a switch circuit interposed between the signal controller and the subtractor. When an interfering signal is detected, the switch circuit provides an electrical path from the signal controller to the subtractor so that a cancellation signal may be injected into the receiver transmission line. If no interfering signal is detected, the switch circuit opens the connection between the signal controller and the subtractor so that no noise from the interference cancellation system is injected into the radio receiver system.

6 Claims, 6 Drawing Sheets

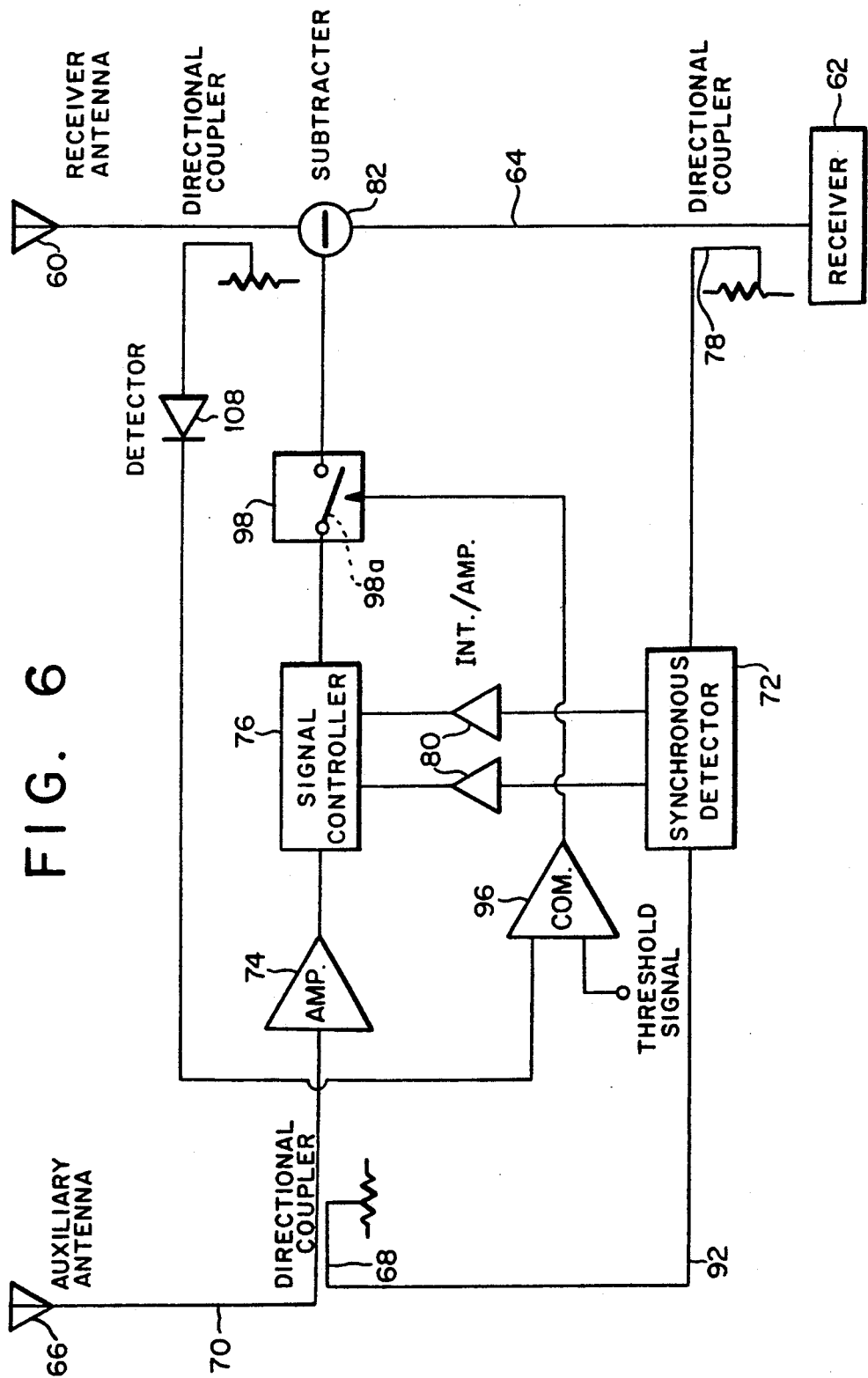

INTERFERENCE CANCELLATION SYSTEM HAVING NOISE REDUCTION FEATURES AND METHOD

CROSS REFERENCE TO RELATED APPLICATIONS

Reference is made to U.S. patent application Ser. No. 458,901 entitled "Interference Cancellation System For Interference Signals Having An Arbitrary And Unknown Duration And Direction", by A. Talwar, filed Dec. 29, 1989, the disclosure of which is incorporated herein by reference.

BACKGROUND OF THE INVENTION

1. Field of the Invention

This invention relates to radio communication systems and methods, and more particularly relates to interference cancellation systems and methods for minimizing or eliminating interference in radio receivers due to unwanted signals. Even more specifically, this invention relates to a cancellation system having noise reduction features, and a method for reducing noise in a radio receiver system attributable to an interference cancellation system connected to the receiver system.

2. Description of the Prior Art

FIG. 1 is a functional diagram of a conventional interference cancellation system connected to a radio receiver system, shown generally as including a receiver antenna 2, a receiver 4 and a transmission line 6 interconnecting the receiver antenna 2 and the receiver 4. The interference cancellation system includes an auxiliary antenna 8, the purpose of which is to receive an RF sample of an interfering signal and to provide a reference signal for the interference cancellation system.

This reference signal is used to detect the presence, amplitude and phase of the same interfering signal in the transmission line 6 between the receiver antenna 2 and the receiver 4, in the following manner.

A first coupler 10 is electrically connected to the auxiliary antenna transmission line 12 to provide a portion of the reference signal corresponding to the interfering signal received by the auxiliary antenna 8 to one input of a synchronous detector 14. A sample of the signal received on the receiver transmission line 6 is provided to a second input of the synchronous detector 14 by using a second coupler 16 connected to the receiver transmission line 6. The synchronous detector 14 thus compares a portion of the reference signal and the sample signal from the receiver transmission line 6, and provides output signals which vary in accordance with the differences and similarities in phase and amplitude of the reference and sample signals.

The output signals of the synchronous detector 14 are modified by respective integrators/amplifiers 18 to provide control signals which are provided to a signal controller 20. The reference signal is also provided, through an appropriate amplifier 22, to the signal controller 20. The signal controller 20 and the synchronous detector 14 thus define an adaptive control loop in the interference cancellation system such that the signal controller 20, driven by the control signals, adjusts the amplitude and phase of the reference signal and provides an adjusted cancellation signal. The cancellation signal is then injected into the receiver signal path defined by the receiver antenna 2, transmission line 6 and receiver 4 with equal amplitude but in a phase which is opposite to that of the interference signal, thereby cancelling the interfering signal in the receiver path. A third coupler, which is referred to as a subtractor 24 in FIG. 1, is used to inject the cancellation signal into the receiver signal path. The interference cancellation system automatically and continuously maintains the amplitude and phase of the cancellation signal for maximum cancellation.

When the direction of the desired signal is fixed, a directive antenna may be used for the receiver antenna. If the direction of the interference signal is arbitrary, then an omni-directional antenna is generally used for the auxiliary antenna 8.

In a conventional interference cancellation system, such as the type described above and illustrated by FIG. 1 of the drawings, the strongest signal received at the auxiliary antenna 8, be it the desired signal or the interfering signal, is cancelled since it dominates and controls the outputs of the synchronous detector 14. When the interfering signal arrives in the same direction as the signal of interest, both the interfering signal as well as the desired signal are cancelled. When only the desired signal is present, or when the desired signal is stronger than the interfering signal, the conventional interference cancellation system must be disabled in order to prevent cancellation of the desired signal.

Another disadvantage of the conventional cancellation interference system is that the auxiliary antenna 8 and the receiver antenna 2 must be spaced apart from one another so that there is a phase difference between the reference signal from the auxiliary antenna and the sample signal taken from the receiver antenna. This phase difference is necessary so that the adaptive control loop of the cancellation system, and in the particular the synchronous detector 14 of the loop, can distinguish between the two signals and provide a proper detector output signal to the signal controller 20.

DESCRIPTION OF THE INVENTION IN THE RELATED APPLICATION

U.S. patent application Ser. No. 458,901 entitled "Interference Cancellation System For Interference Signals Having An Arbitrary And Unknown Duration And Direction", by A. Talwar, filed Dec. 29, 1989, discloses an interference cancellation system which is not disabled when no interference signals are present.

Referring to FIG. 2 of the above-identified related application and the reference numerals used therein, the interference cancellation system disclosed in the related application is adapted to be connected to a radio receiver system having a receiver antenna 30, a receiver 32 and a receiver transmission line 34 interconnecting the receiver antenna 30 with the receiver 32. The interference cancellation system includes an auxiliary antenna 36 for receiving an interfering signal, a first directional coupler 38 connected to the auxiliary antenna 30, a second directional coupler 48 connected to the receiver transmission line 34, a synchronous detector 42 connected to the first and second directional couplers 38, 48, a signal controller 46 connected to the synchronous detector, a subtractor 52 connected to the receiver transmission line 34 and to the signal controller 46, an amplifier 44 interposed between the first coupler 38 and the signal controller 46, and integrators/amplifiers 50 interposed between the synchronous detector 42 and the signal controller 46.

The auxiliary antenna 36 used in the interference cancellation system exhibits a null in a narrow direction, which null is directed toward a desired signal and parallel with the boresight of the receiver antenna 30. The angle over which a signal is not cancelled depends on the maximum gain in the auxiliary signal path of the cancellation system, i.e., the gain from the auxiliary antenna 36, the first directional coupler 38, the amplifier 44, the signal controller 46 and to the subtractor 52. The angle over which cancellation does not occur increases as the maximum gain in the auxiliary signal path is increased.

A variation of the interference cancellation system described above is where the auxiliary antenna is an omni-directional antenna, and the total gain of the auxiliary signal path is limited. Any signal arriving within a predetermined beamwidth of the receiver antenna is not cancelled since there is insufficient signal amplitude in the auxiliary signal path for cancellation. For signals arriving outside of this beamwidth, this limitation does not apply. When only the desired signal is present, it is not cancelled, assuming that the boresight of the receiver antenna is pointed in the direction of the desired signal.

In each of the embodiments of the interference cancellation system described above, the interference cancellation system is not turned off when interfering signals are absent. In such a situation, thermal noise power from the amplifier 44 in the auxiliary signal path of the interference cancellation system and noise from other components of the cancellation system are injected into the receiver signal path, even when no interfering signals are present. This noise may degrade the performance of the radio receiver system connected to the interference cancellation system and effectively lower the signal-to-noise ratio of the receiver.

OBJECTS AND SUMMARY OF THE INVENTION

It is an object of the present invention to provide an interference cancellation system which will minimize noise degradation of a radio receiver system connected to the interference cancellation system when no interfering signals are present.

It is another object of the present invention to provide an interference cancellation system which will automatically detect the relative absence of interfering signals and disconnect itself from a radio receiver system to which it is connected when no interfering signals are present.

It is yet another object of the present invention to provide an interference cancellation system having noise reduction features which is relatively simple in operation and in construction.

In accordance with one form of the present invention, an interference cancellation system for connection to a radio receiver system having a receiver antenna, a receiver portion and a receiver transmission line interconnecting the receiver antenna with the receiver, includes an auxiliary antenna for receiving an interfering signal, the auxiliary antenna providing a reference signal corresponding to the interfering signal received by the auxiliary antenna, and a first directional coupler coupled to the auxiliary antenna and providing a first coupler output signal corresponding to the reference signal. An amplifier is coupled to the directional coupler.

The interference cancellation system further includes a second directional coupler coupled to the receiver transmission line. The second directional coupler provides a sample signal corresponding to the interfering and desired signals received by the receiver antenna.

A synchronous detector is further included in the interference cancellation system. The synchronous detector has at least two inputs which are respectively effectively coupled to the first and second directional couplers so that the synchronous detector is provided with the first coupler output signal and the sample signal. The synchronous detector compares the first coupler output signal and the sample signal and provides at least one synchronous detector output signal. An integrator/amplifier is connected to the synchronous detector to integrate and amplify the synchronous detector output signal and to provide a control signal.

The interference cancellation system further includes a signal controller. The signal controller has a first input which is coupled to the output of the amplifier so that it receives an amplified version of the reference signal, and at least a second input which is electrically coupled to the output of the integrator/amplifier so that it receives the control signal from the integrator/amplifier.

The signal controller provides a cancellation signal which corresponds to the reference signal adjusted in phase and amplitude to cancel an interfering signal received by the radio receiver system. This cancellation signal is injected into the radio receiver system by a subtractor coupled to the receiver transmission line. The cancellation signal injected into the receiver signal path, defined by the receiver antenna, transmission line and receiver, is equal to and opposite in phase to the interfering signal carried by the receiver transmission line so as to cancel the received interfering signal.

In accordance with the present invention, the interference cancellation system further includes a third directional coupler which is electrically coupled to the transmission line interconnecting the first coupler to the synchronous detector and providing a portion of the reference signal to the synchronous detector. An output of the third directional coupler is connected to a detector, which is used to sense the signal power of the reference signal. The output of the detector is provided to a comparator.

The comparator compares the signal strength of that portion of the reference signal which is provided to the detector with a predetermined threshold level. The output of the comparator is connected to the control input of a switch circuit, which switch circuit is coupled between the output of the signal controller and the subtractor.

When the signal power detected by the detector is below the predetermined threshold level, the output signal of the comparator will be in one state to cause the switch circuit to open the signal controller path, that is, the connection between the signal controller and the subtractor. The open switch circuit effectively disconnects the interference cancellation system from the radio receiver system. This prevents the injection of noise from the cancellation system into the receiver signal path.

If the signal power detected by the detector is above the threshold level, the comparator's output signal will go to a different state, causing the switch circuit to close. The signal controller path from the signal controller to the subtractor will then be completed, so that the signal controller can provide a cancellation signal to the subtractor to cancel an interfering signal carried by the receiver transmission line.

In an alternative embodiment, two switch circuits may be used instead of the switch circuit used in the signal controller path. One switch circuit is connected between the receiver antenna and the subtractor, and the other switch circuit is connected between the subtractor and the receiver. The control input of each switch circuit is connected to the output of the comparator. When the detector detects little or no signal power, the comparator will cause the two switch circuits to completely bypass the interference cancellation system. When an interfering signal is detected, i.e., the signal strength of the reference signal portion detected by the detector is greater than the predetermined threshold, the comparator will change states and cause the switch circuits to effectively reconnect the interference cancellation system to the radio receiver system.

These and other objects, features and advantages of this invention will be apparent from the following detailed description of illustrative embodiments thereof, which is to be read in connection with the accompanying drawings.

BRIEF DESCRIPTION OF THE DRAWINGS

FIG. 6 is a functional block diagram of a fifth form of the interference cancellation system of the present invention.

DETAILED DESCRIPTION OF THE PREFERRED EMBODIMENTS

Figure 1:
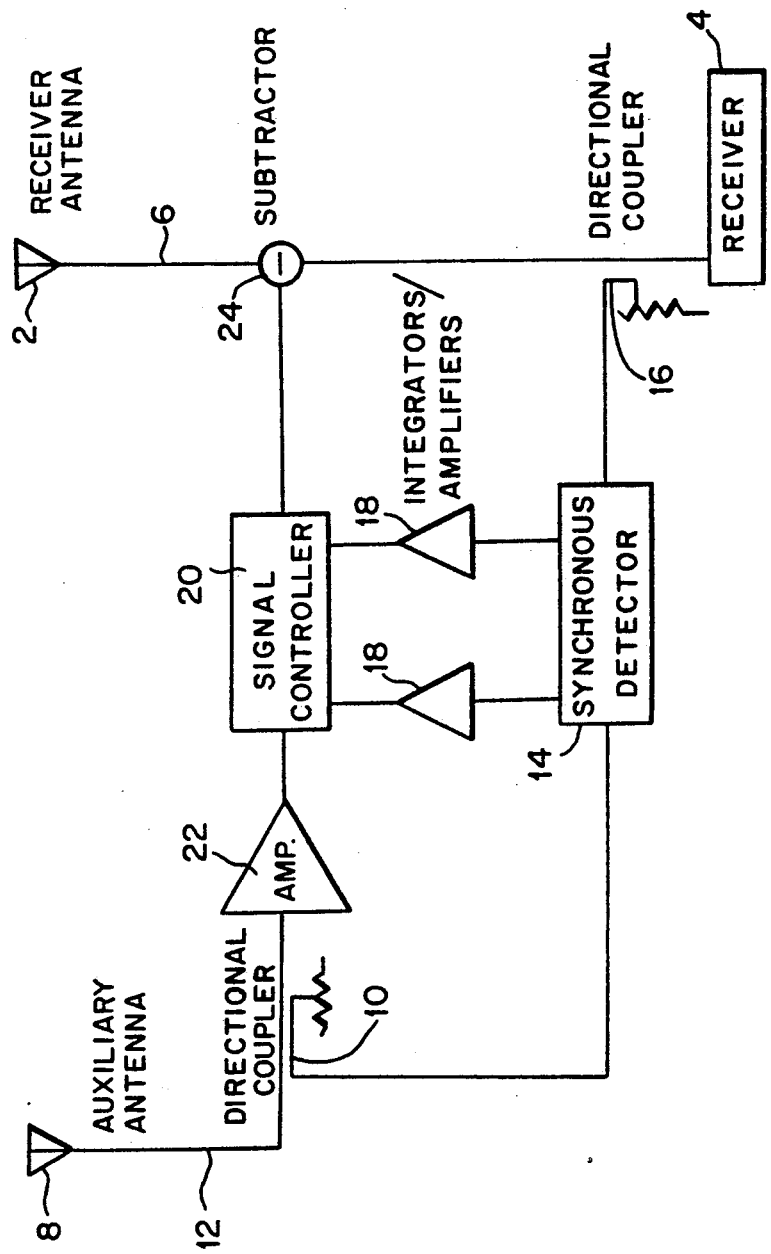
FIG. 1 is a functional block diagram of a conventional interference cancellation system.
Figure 2:
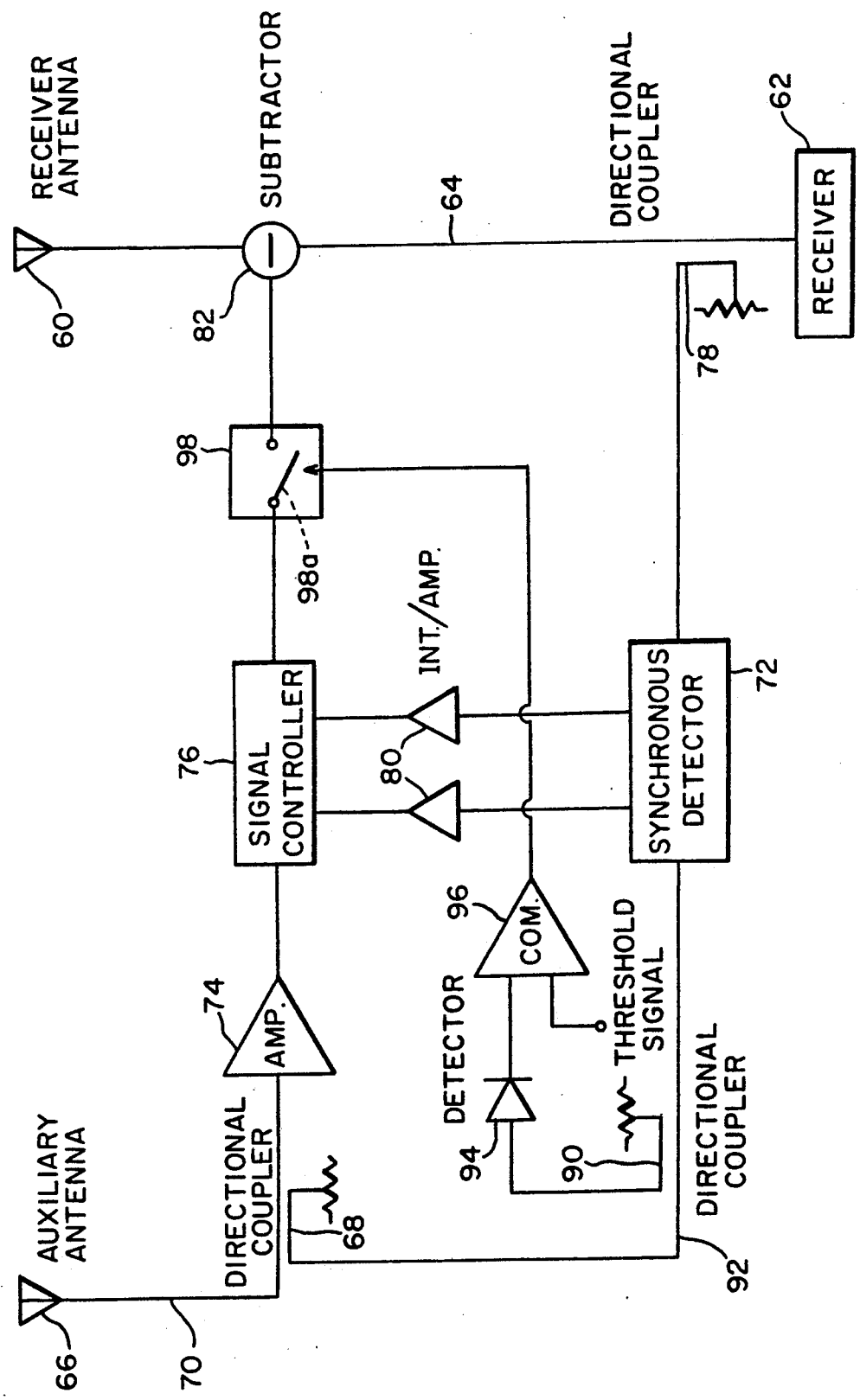
FIG. 2 is a functional block diagram of one form of the interference cancellation system of the present invention.

FIG. 2 illustrates functionally one form of the interference cancellation system of the present invention. The interference cancellation system is adapted to be connected to a radio receiver system having a receiver antenna 60, a receiver 62, and a receiver transmission line 64 connecting the receiver antenna 60 with the receiver 62. The receiver antenna 60 receives an interfering signal and a desired signal, as sometimes may occur when a receiver and a transmitter are collocated, which signals are provided to the receiver 62 by the transmission line 64.

The interference cancellation system includes an auxiliary antenna 66 for receiving an interfering signal. The auxiliary antenna 66 is connected to a first directional coupler 68 by a transmission line 70, and provides to the first directional coupler 68 a reference signal which corresponds to the interfering signal received by the auxiliary antenna 66. One output of the first directional coupler 68 is connected to an input of a synchronous detector 72. The other output of the first directional coupler 68 is provided to an amplifier 74, whose output is connected to the input of a signal controller 76. The first directional coupler 68 thus provides a portion of the reference signal to the synchronous detector 72, as well as to the signal controller 76 through the amplifier 74.

The interference cancellation system further includes a second directional coupler 78. The second directional coupler 78 is electrically coupled to the receiver transmission line 64, and has an output on which is provided a sample signal corresponding to the signals received by the receiver antenna 60.

As mentioned previously, the interference cancellation system includes a synchronous detector 72. The synchronous detector 72 has at least two input ports (i.e., a reference port and an error port) which are respectively electrically coupled to the outputs of the first directional coupler 68 and the second directional coupler 78 so that the reference signal and the sample signal are provided to the two input ports of the synchronous detector.

The synchronous detector 72 is basically a quadrature phase detector. A typical synchronous detector which is suitable for use is described in U.S. Pat. No. 3,699,444 which issued to Rabindra Ghose and Walter Sauter, the disclosure of which is incorporated herein by reference. The synchronous detector 72 compares the reference signal and the sample signal and provides one or more detector output signals.

The synchronous detector 72 may be regarded as a switch controlled by zero-crossing of the reference port signal of such a detector. Because the synchronous detector is referenced to the interference signal (i.e., the reference signal), a non-zero sample signal will cause the synchronous detector 72 to output a DC detector output signal. An amplifier and/or an integrator 80 may be included in the interference cancellation system and connected to the synchronous detector's output so that the DC output signals of the detector will be amplified and integrated to create control signals, which signals are provided to the signal controller 76 of the interference cancellation system.

A signal controller 76 suitable for use in the interference cancellation system of the present invention is described in U.S. Pat. No. 3,699,444, mentioned previously. In its simplest form, the signal controller consists of an in-phase and a quadrature-phase electronic attenuator, each being controllable by a respective DC control signal. One of its inputs is provided with a portion of the reference signal from the output of the first directional coupler 68. Another input of the signal controller receives the control signals from the amplifiers/integrators 80. An output of the signal controller is provided to a subtractor 82, or 180° hybrid, which subtractor is coupled to the receiver transmission line 64.

The signal controller 76 provides a cancellation signal to the subtractor 82 which, in effect, injects the cancellation signal into the receiver signal path defined by the receiver antenna 60, transmission line 64 and receiver 62 and, more specifically, onto the receiver transmission line carrying the desired and interfering signals.

Because the synchronous detector 72 is referenced to the interfering signal to be eliminated, the non-zero sample signal will result in DC signals at the outputs of the synchronous detector. The DC signals are amplified and integrated to create control signals for the signal controller 76 such that the values of gain and phase of the cancellation signal which is generated by the signal controller 76 change only when the sample signal is present. As the non-zero sample signal causes the control signals to change, the values of gain and phase of the cancellation signal change until such values become what are exactly required to drive the sample signal to zero. The cancellation signal which is injected into the receiver transmission line 64 is equal to and opposite in phase to the interfering signal received by the receiver antenna 60 and carried by the receiver transmission line 64 so as to cancel the received interfering signal.

In one form of the present invention, the auxiliary antenna 66 is an omni-directional antenna, such as a vertical dipole. Accordingly, the input will have a fixed gain in any direction and thus receive an interfering signal from any direction. The receiver antenna 60, on the other hand, is of the directive type, such as a parabolic antenna. Accordingly, it has relatively significant gain within a predetermined angle about its boresight.

The receiver antenna 60 is pointed in a manner such that the desired signal arrives within the predetermined angle. If the gain of the interference cancellation system in the auxiliary signal path, that is, from the auxiliary antenna 66 to the subtractor 82, is less than the gain of the receiver antenna 60 within the predetermined angle of boresight, then the desired signal will not be cancelled. However, all interfering signals from directions outside of the predetermined angle will be cancelled or reduced, as the gain of the interference cancellation system and in particular the auxiliary signal path of the system will exceed the gain of the receiver antenna 60 outside of the predetermined angle of boresight.

For example, assume that the gain of the receiver antenna 60 is +10 dB within the predetermined angle of boresight, and the gain of the omni-directional auxiliary antenna 66 is zero dB. The total gain of the auxiliary signal path is limited to +5 dB maximum. Any signal arriving within the 5 dB beamwidth of the receiver antenna 60 is not cancelled since there is insufficient signal amplitude in the auxiliary path for cancellation. This is irrespective of whether there are any signals outside of the 5 dB beamwidth. For signals arriving outside of this beamwidth, this limitation does not apply. Accordingly, when only the desired signal is present (and is received within the predetermined angle of boresight of the receiver antenna 60), it is not cancelled.

In another form of the interference cancellation system of the present invention, the auxiliary antenna 66 is chosen, not to be omni-directional, but rather to exhibit a null in a fairly narrow direction. An example of such an antenna is a loop antenna (which has nulls in its antenna pattern which are diametrically opposite one another) or an antenna having a cardioid pattern (see FIG. 4). The auxiliary antenna 66 is positioned such that the null in its antenna pattern is pointed in the direction of the desired signal, which is also the direction in which the receiver antenna 60 is directed, so that the centerline of the null of the auxiliary antenna 66 is substantially parallel to the boresight of the receiver antenna. Thus, the gain of the auxiliary antenna 66 and, consequently, of the auxiliary signal path from the auxiliary antenna 66 to the subtractor 82, automatically falls off within a predetermined angle of the boresight of the receiver antenna 60 such that no cancellation occurs within this predetermined angle.

Using an auxiliary antenna 66 exhibiting a null in its antenna path allows a much higher gain to be used in the auxiliary path, i.e., from the auxiliary antenna 66 to the subtractor 82. The auxiliary path gain of the interference cancellation system may, in effect, be greater than that of the receiver antenna 60, as long as the auxiliary antenna 66 is directed with its null towards the desired signal, and the receiver antenna is directed in the same manner, and as long as the gain of the auxiliary path at the null is maintained at a level which is less than the gain of the receiver antenna within a predetermined angle of the receiver antenna boresight.

A more detailed description of that portion of the interference cancellation system described above is disclosed in U.S. patent application Ser. No. 458,901 entitled "Interference Cancellation System For Interference Signals Having An Arbitrary And Unknown Duration And Direction", by A. Talwar, filed Dec. 29, 1989, the disclosure of which is incorporated herein by reference.

In the two embodiments of the interference cancellation system described in the above-identified U.S. patent application, the interference cancellation system always remain on and connected to the radio receiver system. As a result, the interference cancellation system may be injecting thermal noise power into the receiver signal path due to the amplifier 44 in the auxiliary signal path and noise from other components of the interference cancellation system even when no interfering signals are present. In such situations, the noise performance of the radio receiver system being protected by the interference cancellation system can be degraded due to the injection of noise from the cancellation system, resulting in a lower signal-to-noise ratio for the radio receiver.

To minimize such noise degradation of the receiver when no interfering signals are present, the interference cancellation system of the present invention includes components which either disable the interference cancellation system from injecting noise into the receiver path when no interfering signals are present, or automatically disconnect the interference cancellation system from the radio receiver when no interfering signals are present.

Referring again to FIG. 2 of the drawings, an interference cancellation system constructed in accordance with one form of the present invention further includes a third directional coupler 90 electrically coupled to the transmission line 92 interconnecting the output of the first directional coupler 68 with the reference port of the synchronous detector 72. This transmission line 92 carries a portion of the reference signal corresponding to any interfering signal received by the auxiliary antenna 66.

More specifically, the input of the third directional coupler 90 is connected to an output of the first directional coupler 68, and one output of the third directional coupler 90 is connected to the reference port of the synchronous detector 72. A second output of the third directional coupler 90 thus provides an output signal which is effectively an attenuated version of the reference signal.

The interference cancellation system further includes a first detector 94, shown symbolically in FIG. 2 as a diode, which is electrically coupled to the second output of the third directional coupler 90, and which provides a detected output signal on its output in the form of a voltage which varies in accordance with the attenuated reference signal provided on its input. The detector may be a rectifier demodulator, diode detector, or the like.

The output of the detector 94 is electrically coupled to one input of a voltage comparator 96, so as to provide the detected output signal to the comparator. The comparator 96 includes another input on which is provided a threshold signal in the form of a predetermined voltage level. The output of the comparator 96 provides an output signal having two states—one state when the detected output signal, corresponding to the reference signal, of the detector 94 is below the threshold signal voltage level, and another state when the detected output signal is greater than or equal to the threshold signal voltage level.

A switch circuit 98 basically comprising an electronic, mechanical or other type of switch is electrically coupled to the signal controller 76 and to the subtractor 82. More specifically, the switch circuit 98 is positioned in the signal controller path, that is, between the signal controller 76 and the subtractor 82, with one terminal electrically coupled to the output of the signal controller and another terminal electrically coupled to the input of the subtractor, which receives the cancellation signal from the signal controller 76. The switch circuit 98 is depicted in FIG. 2 as including a single pole, signal throw type switch 98a, although other configurations may be used. The switch circuit 98 includes a control input which, in response to the state of the comparator output signal provided to the control input, causes the switch 98a to open or close an electrical path between the terminals of the switch. The output signal of the comparator 96 is provided to the control input of the switch circuit 98.

When no interfering signal is present, the reference signal will be at a relatively low power level. This reference signal is effectively detected by the detector 94, whose detected output signal provided to the comparator 96 will correspondingly be at a low voltage level. If the voltage level of the detected output signal is below the predetermined threshold signal voltage level, the comparator 96 will cause its output signal to be in the first state. The output signal from the comparator 96 will, accordingly, cause the switch circuit 98 to open the electrical path between the signal controller 76 and the subtractor 82 so that no noise from the interference cancellation system is injected into the receiver transmission line 64 and, in turn, into the receiver 62.

When an interfering signal is present and received by the auxiliary antenna 66, that portion of the reference signal on the second output of the third directional coupler 60 and detected by the first detector 94 will, correspondingly, cause the detected output signal from the detector to be at a voltage level which is greater than or equal to the predetermined threshold signal voltage level on the second input of the comparator 96. This will cause the output signal from the comparator 96 to switch to the second state which, in turn, will cause the switch circuit 98 to provide an electrical path between the signal controller 76 and the subtractor 82, so that the cancellation signal from the signal controller 76 may be injected into the receiver path to cancel any interfering signals received by the receiver antenna 60.

A modification of the interference cancellation system described above is shown in FIG. 3 of the drawings. The interference cancellation system includes all of the basic components described previously and shown in FIG. 2, except that switch circuit 98 is eliminated and replaced by two switch circuits 100, 102.

More specifically, switch circuit 100, which may be an RF type switch, has one terminal which is connected to the receiver antenna 60, and another terminal which is connected to an input of the subtractor 82. Switch circuit 102 may similarly be an RF type switch, having one terminal electrically coupled to the output of the subtractor 82 and another terminal electrically coupled to the receiver 62.

Figure 3:
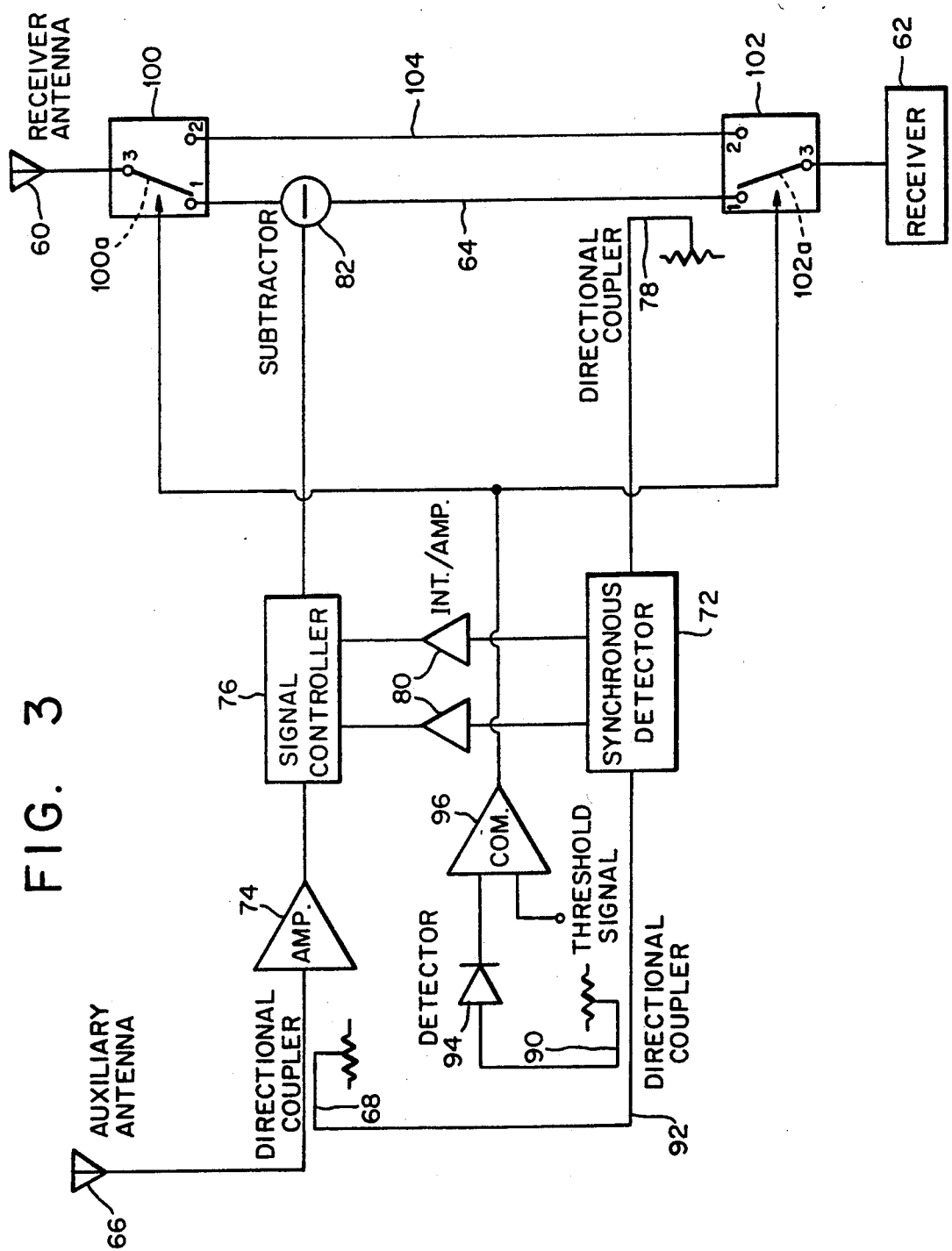
FIG. 3 is a functional block diagram of a second form of the interference cancellation system of the present invention.

Each switch circuit 70, 72 is depicted in FIG. 3 as including a double pole, single throw type switch 100a, 102a, respectively. The terminal designated "3" in FIG. 3 of each switch circuit 100, 102 is connected to the wiper or switching element of the switch 100a, 102a and, depending on the state of the switch circuit, is electrically coupled to one of two other terminals of the switch, designated "1" and "2", respectively.

Switch circuit 100 has its switch terminal "3" electrically coupled to the receiver antenna 60. Its switch terminal "1" is electrically coupled to an input of the subtractor 82.

Switch circuit 102 has its switch terminal "3" electrically coupled to the receiver 62, and has its switch terminal "1" electrically coupled to the output of the subtractor 82. Switch terminals "2" of switch circuits 100, 102 are electrically coupled together by a bypass transmission line 104.

Switch circuits 100, 102 each also include a control input. As with the switch circuit 98 shown in FIG. 2, the control inputs of switch circuits 100, 102 are electrically coupled to the output of comparator 96. Accordingly, when the output signal from the comparator 96 is in the first state, corresponding to when no interfering signal is received by the auxiliary antenna 66, switch circuits 100, 102 will switch in response to the comparator output signal to provide an electrical path between the switch terminals designated "2" and "3" in FIG. 3, so that the receiver antenna 60 is directly electrically connected to the receiver 62 through the bypass transmission line 104. The interference cancellation system is entirely bypassed and disconnected from the radio receiver system.

When an interfering signal is received by the auxiliary antenna 66, the output signal of the comparator 96 will change to the second state and, in turn, will cause switch circuits 100, 102 to switch to provide an electrical path between terminals "3" and "1". This will effectively reconnect the interference cancellation system to the radio receiver system, so that the interference cancellation system may inject a cancellation signal into the receiver path to cancel any interfering signals received by the receiver antenna 60.

Figure 4:
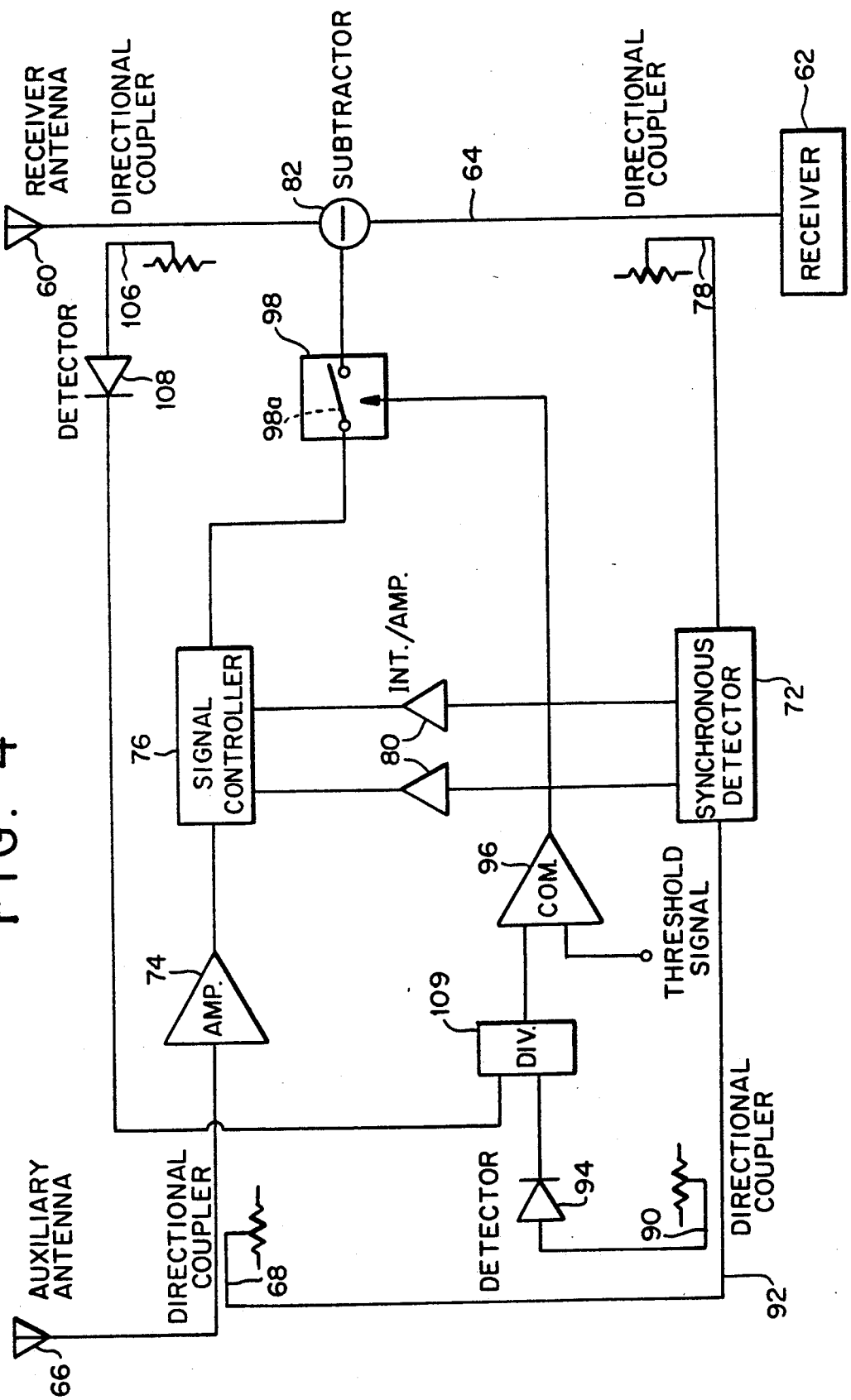
FIG. 4 is a functional block diagram of a third form of the interference cancellation system of the present invention.

Another embodiment of the interference cancellation system constructed in accordance with the present invention is illustrated by FIG. 4 of the drawings. In this embodiment, the interference cancellation system includes an auxiliary antenna 66, a first directional coupler 68, an amplifier 74, a signal controller 76, integrators/amplifiers 80, a synchronous detector 72, a second directional coupler 78 and a subtractor 82. All of these components are interconnected in the manner described with respect to the embodiment shown in FIG. 2. This embodiment also includes a third directional coupler 90, a first detector 94, a comparator 96 and a switch circuit 98, again all interconnected as described previously with respect to the embodiment illustrated by FIG. 2, except that the comparator's first input is not provided with the detected output signal of the first detector 94, but rather is provided with a signal which varies in accordance with the ratio of the power of the signal received by the receiver antenna 60 and the power of any interfering signal received by the auxiliary antenna 76.

More specifically, a fourth directional coupler 106 is positioned in the receiver signal path. That is, it is interposed between the receiver antenna 60 and the subtractor 82. Even more specifically, a first input of the fourth directional coupler 106 is electrically coupled to the receiver antenna 60. One output of the fourth directional coupler 106 is electrically coupled to an input of the subtractor 82. Another output of the fourth directional coupler is, accordingly, provided with an output signal which is a sample of the signal received by the receiver antenna 60.

The output signal of the fourth directional coupler 106 is provided to the input of a second detector 108, whose output is electrically coupled to one input of a divider 109. Another input of divider 109 is electrically coupled to the output of the first detector 94. Thus, the detected output signals of the first and second detectors 94, 108 are provided to the inputs of the divider 109.

Divider 109 effects a division between the detected output signals of the first and second detectors 94, 108, with the first detector's output signal as the denominator and the second detector's output signal as the numerator. Since the detected output signals of the first and second detectors vary in accordance with the power of the signals received by the auxiliary and receiver antennas, respectively, the divider 109 effectively provides an output signal which is the ratio of the signal power, Pr, at the receiver antenna 60 to the signal power, Pa, at the auxiliary antenna 66.

The divider output signal is provided to one input of the comparator 96, whose other input is provided with a predetermined threshold signal, as in the previous embodiments. The output signal of the comparator 96 is provided to the control input of switch circuit 98.

The auxiliary antenna 66 of the interference cancellation system described above and illustrated by FIG. 4 is preferably selected to exhibit a null in its antenna pattern, such as provided by a loop antenna. The auxiliary antenna 66 is positioned such that its null is pointed toward the direction of the signal of interest (i.e., the desired signal). The receiver antenna 60 is a directional antenna, such as a parabolic antenna.

The interference cancellation system of FIG. 4 effectively compares the signal power in the receiver signal path (i.e., received by the receiver antenna) and the signal power in the auxiliary signal path (i.e., received by the auxiliary antenna) of the interference cancellation system to determine if a significant interfering signal is present at angles away from the direction of the desired signal. If no interference is present at angles other than the direction of the signal of interest, then the ratio of power levels in the receiver signal path and the auxiliary signal path is relatively high.

For example, if the gain of the receiver antenna 60 is +10 dBi, and the null of the auxiliary antenna 66 is −20 dBi, then the ratio of the power, Pr, at the receiver antenna 60, to the power, Pa, at the auxiliary antenna 66, is given by the equation:

$$Pr/Pa = 30 dB$$

This is because no interfering signal is received, and only the desired signal is received within a predetermined angle of the boresight of the receiver antenna 60 and within the null of the auxiliary antenna 66.

If an interfering signal arrives at any angle outside of the predetermined angle of boresight of the receiver antenna 60, this ratio is reduced. The comparator 66 effectively compares the ratio of the receiver and auxiliary antenna signal power levels with the predetermined threshold signal voltage level. If an interfering signal is present and the ratio is reduced such that the divider output signal level is less than the predetermined threshold signal level, the output signal of the comparator 96 will go to the second state, causing the switch circuit 68 to provide an electrical path between the output of the signal controller 76 and the subtractor 82, thus enabling the interference cancellation system and allowing the system to inject a cancellation signal into the receiver path to cancel an interfering signal received by the receiver antenna 60.

If no interfering signal is present, the ratio of the signal power levels will return to the original higher ratio such that the divider output signal level is equal to or greater than the predetermined threshold signal level. The output signal from the comparator will go to the first state, which will cause the switch circuit 98 to open the signal controller path between the signal controller 76 and the subtractor 82, thus disabling the interference cancellation system so that no thermal noise generated by the interference cancellation system is injected into the receiver signal path.

Figure 5:
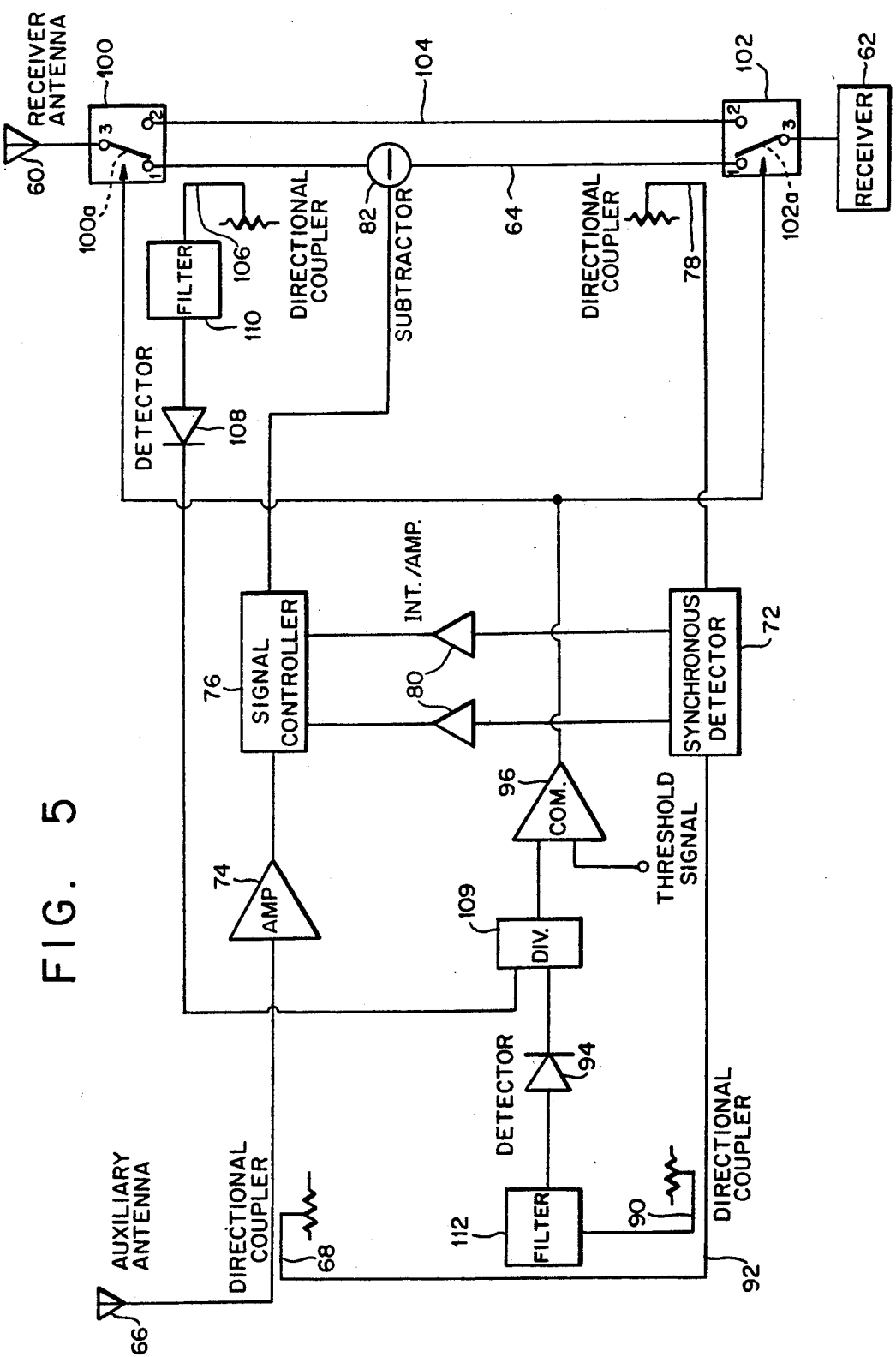
FIG. 5 is a functional block diagram of a fourth form of the interference cancellation system of the present invention.

A modification of the interference cancellation system shown in FIG. 4 is illustrated by FIG. 5. In the modified embodiment, switch circuit 98 is omitted, and switch circuits 100, 102 are used in the receiver signal path, and are connected to the interference cancellation system and controlled by comparator 96 in the same manner as described in relation to the embodiment shown in FIG. 3 of the drawings. Accordingly, if the ratio of the receiver and auxiliary antenna signal power levels falls below a predetermined value, comparator 96 will cause switch circuits 100, 102 to electrically coupled the interference cancellation system to the radio receiver system. If the ratio is equal to or above the predetermined value, no substantial interfering signals are present, and the comparator 96 will cause switch circuits 100, 102 to disconnect the interference cancellation system from the radio receiver system so that the signals received by the receiver antenna 60 are provided directly to the receiver 62 on the bypass transmission line 104.

It should be noted that, if there is only a concern about cancelling interfering signals of a predetermined frequency, then a frequency converter or filter 110 may be interposed between the input of the second detector 108 and the output of the fourth directional coupler 106, as shown in FIG. 5. The frequency converter or filter 110 is effectively tuned to allow signals of the predetermined frequency to be detected and used in the comparison with the reference signal. A similar frequency converter or filter 112 is also positioned between the input of the first detector 94 and the output of the third directional coupler 90 so that the ratio of the receiver and auxiliary antenna signal power levels is not affected.

The embodiments of the interference cancellation system illustrated by FIGS. 4 and 5 are highly applicable to a situation where an omni-directional antenna, such as a dipole antenna, is used for the auxiliary antenna 66, and a directional antenna, such as parabolic antenna, is used as the receiver antenna 60. In such a case, the ratio of the signal power at the two antennas 60, 66 is, effectively, the ratio of the gains of the two antennas. When the ratio of the signal powers is less than the the ratio of the antenna gains, it may be assumed that an interfering signal is present other than within a predetermined angle of the boresight of the receiver antenna 60. Under these circumstances, the interference cancellation system is enabled.

For example, if the gain of the receiver antenna 60 is 10 dB, and the gain of the auxiliary antenna 66, which is an omni-directional antenna, is 0 dB, and assuming that the receiver antenna 60 is pointed with its boresight in the direction of the signal of interest, then the total signal power at the auxiliary antenna 66 is equal to the signal power attributable to an interfering signal and the signal power attributable to the signal of interest.

If an interfering signal is within the 10 dB beamwidth of the receiver antenna 60, then the total power at the receiver antenna will be greater than or equal to the signal power attributable to the interfering signal and ten times the signal power attributable to the signal of interest.

If the signal power from the receiver antenna 60 is approximately equal to ten times the signal power from the auxiliary antenna 66, then there are no interfering signals of any significance present away from the boresight of the receiver antenna 60.

However, if the signal power from the receiver antenna 60 is now, for example, only five or seven times the signal power from the auxiliary antenna 66, this is an indication that there is an interfering signal of significance away from the boresight of the receiver antenna 60. Under such conditions, the interference cancellation system will automatically reconnect itself to the radio receiver system.

Another embodiment of the interference cancellation system of the present invention is illustrated by FIG. 6 of the drawings. The interference cancellation system includes all of the components shown in FIG. 2 of the drawings, including an auxiliary antenna 66, a first directional coupler 68, an amplifier 74, a signal controller 76, a switch circuit 98 (or in the alternative, switch circuits 100, 102 connected as shown in FIG. 3), a second directional coupler 78, a synchronous detector 72, integrators/amplifiers 80, and a subtractor 82, all interconnected in the manner described with respect to the interference cancellation system shown in FIG. 2. Comparator 96 is also included. The first detector 94 and the third directional coupler 90 are omitted in this embodiment.

In addition, the interference cancellation system includes a fourth directional coupler 106 and a second detector 108 interconnected to the other components as described with respect to the embodiment illustrated by FIG. 4. The output of the second detector 108 is connected to one input of comparator 96, and the other input of comparator 96 is provided with a predetermined threshold signal voltage level.

The interference cancellation system of this particular embodiment has an omni-directional auxiliary antenna 66, and an omni-directional receiver antenna 60. This interference cancellation system would be adapted for implementation in an aircraft or in other situations where the direction of the signal of interest or the interfering signal is not known, or where the signal of interest is continually changing direction with respect to the receiver antenna.

One would generally known from the performance of the radio receiver system what the strongest power level of the signal of interest is, for example, −50 dBm. If the power of the signal received by the receiver antenna 60 increases to a level which is greater than what is expected, for example, −30 or −40 dBm, then it may be concluded that an interfering signal is present and being received by the receiver antenna 60.

In accordance with the present invention, the fourth directional coupler 106 samples the signal present in the receiver signal path and received by the receiver antenna 60 and provides the sample signal to the second detector 108. The second detector 108 provides a detected output signal in the form of a voltage level to one input of comparator 96. If the detector output signal is greater that the predetermined threshold signal voltage level provided to the other input of comparator 96, indicating that a greater than expected signal power is received by the receiver antenna 60, the comparator 96 will cause switch circuit 98 to interconnect the signal controller 76 to the subtractor 82 so that a cancellation signal may be injected into the radio receiver system.

On the other hand, if the voltage level of the detected output signal is less than or equal to the predetermined threshold signal voltage level, the comparator 96 will cause switch circuit 98 to open, effectively disconnecting the interference cancellation system from the radio receiver system, and so that no noise from the interference cancellation system may be injected into the radio receiver system.

The interference cancellation system of the present invention will minimize the noise degradation of the radio receiver to which it is connected when no interfering signals are present. The interference cancellation system may remain activated, and will automatically disconnect itself from the radio receiver when no interfering signals are detected.

The system is simple in operation and structure, and may be used in connection with land based or aircraft radio receiver systems.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An interference cancellation system for connection to a radio receiver system having a receiver antenna, a receiver and a receiver transmission line electrically coupling the receiver antenna to the receiver, the interference cancellation system comprising:

an auxiliary antenna for receiving an interfering signal, the auxiliary antenna providing a reference signal corresponding to the interfering signal received by the auxiliary antenna;

a first directional coupler, the reference signal being provided to the first directional coupler, the first directional coupler having first and second outputs and respectively providing thereon first and second output signals each corresponding to the reference signal;

a second directional coupler, the second directional coupler being electrically coupled to the receiver transmission line, the second directional coupler having an output and providing thereon a sample signal corresponding to an interfering signal and desired signal received by the receiver antenna;

a third directional coupler, the third directional coupler being electrically coupled to the first directional coupler and having first and second outputs and respectively providing thereon first and second output signals each corresponding to the reference signal;

a first detector, the first detector being electrically coupled to the third directional coupler and providing a first detected output signal in response to the first output signal of the third directional coupler;

a synchronous detector, the synchronous detector having at least two inputs respectively electrically coupled to the third and second directional couplers and being responsive to the second output signal of the third coupler and the sample signal of the second coupler, the synchronous detector comparing the third coupler second output signal and the sample signal and providing at least one synchronous detector output signal in response thereto;

a signal controller, the signal controller having a first input electrically coupled to the first directional coupler and being responsive to the first output signal of the first coupler, and at least a second input electrically coupled to the synchronous detector, the signal controller having an output and providing thereon a cancellation signal in response to the synchronous detector output signal;

a subtractor, the subtractor being electrically coupled to the receiver transmission line and being further electrically coupled to the signal controller, the subtractor having an input on which is provided the cancellation signal, the subtractor effectively injecting the cancellation signal onto the receiver transmission line carrying the received interfering and desired signals, the cancellation signal injected into the receiver transmission line being equal in amplitude and opposite in phase to the interfering signal received by the receiver antenna and carried by the receiver transmission line so as to cancel the interfering signal on the receiver line;

a comparator, the comparator being provided with the first detected output signal of the first detector and with a predetermined threshold signal, the comparator comparing the first detected output signal and the predetermined threshold signal and providing an output signal in response thereto; and switch means for coupling and decoupling at least a portion of the interference cancellation system from the radio receiver system, the switch means being electrically coupled to the comparator and being responsive to the output signal therefrom, the switch means including a first switch circuit, the first switch circuit being electrically coupled to the signal controller and to the subtractor and providing an electrical path between the signal controller and the subtractor in response to the output signal from the comparator.

2. An interference cancellation system for connection to a radio receiver system having a receiver antenna, a receiver and a receiver transmission line electrically coupling the receiver antenna to the receiver, the interference cancellation system comprising:

an auxiliary antenna for receiving an interfering signal, the auxiliary antenna providing a reference signal corresponding to the interfering signal received by the auxiliary antenna;

a first directional coupler, the reference signal being provided to the first directional coupler, the first directional coupler having first and second outputs and respectively providing thereon first and second output signals each corresponding to the reference signal;

a second directional coupler, the second directional coupler being electrically coupled to the receiver transmission line, the second directional coupler having an output and providing thereon a sample signal corresponding to an interfering signal and desired signal received by the receiver antenna;

a third directional coupler, the third directional coupler being electrically coupled to the first directional coupler and having first and second outputs and respectively providing thereon first and second output signals each corresponding to the reference signal;

a first detector, the first detector being electrically coupled to the third directional coupler and providing a first detected output signal in response to the first output signal of the third directional coupler;

a synchronous detector, the synchronous detector having at least two inputs respectively electrically coupled to the third and second directional couplers and being responsive to the second output signal of the third coupler and the sample signal of the second coupler, the synchronous detector comparing the third coupler second output signal and the sample signal and providing at least one synchronous detector output signal in response thereto;

a signal controller, the signal controller having a first input electrically coupled to the first directional coupler and being responsive to the first output signal of the first coupler, and at least a second input electrically coupled to the synchronous detector, the signal controller having an output and providing thereon a cancellation signal in response to the synchronous detector output signal;

a subtractor, the subtractor being electrically coupled to the receiver transmission line and being further electrically coupled to the signal controller, the subtractor having an input on which is provided the cancellation signal, the subtractor effectively injecting the cancellation signal onto the receiver transmission line carrying the received interfering and desired signals, the cancellation signal injected into the receiver transmission line being equal in amplitude and opposite in phase to the interfering signal received by the receiver antenna and carried by the receiver transmission line so as to cancel the interfering signal on the receiver line;

a comparator, the comparator being provided with the first detected output signal of the first detector and with a predetermined threshold signal, the comparator comparing the first detected output signal and the predetermined threshold signal and providing an output signal in response thereto; and switch means for coupling and decoupling at least a portion of the interference cancellation system from the radio receiver system, the switch means being electrically coupled to the comparator and being responsive to the output signal therefrom, the switch means including first and second switch circuits, the first switch circuit being electrically coupled to the receiver transmission line and electrically interposed between the receiver antenna and the subtractor, the second switch circuit being electrially coupled to the receiver transmission line and electrically interposed between the subtractor and the receiver, each of the first and second switch circuits being operable in at least first and second states in response to the output signal of the comparator, wherein the first and second switch circuits provide an electrical path from the receiver antenna to the receiver when the switch circuits are in the first state, thereby effectively decoupling the interference cancellation system from the radio receiver system, and wherein the first and second switch circuits provide an electrical path from the receiver antenna to the subtractor and from the subtractor to the radio receiver when the switch circuits are in the second state, thereby effectively coupling the interference cancellation system to the radio receiver system.

3. An interference cancellation system for connection to a radio receiver system having a receiver antenna, a receiver and a receiver transmission line electrically coupling the receiver antenna to the receiver, the interference cancellation system comprising:

an auxiliary antenna for receiving an interfering signal, the auxiliary antenna providing a reference signal corresponding to the interfering signal received by the auxiliary antenna;

a first directional coupler, the reference signal being provided to the first directional coupler, the first directional coupler having first and second outputs and respectively providing thereon first and second output signals each corresponding to the reference signal;

a second directional coupler, the second directional coupler being electrically coupled to the receiver transmission line, the second directional coupler having an output and providing thereon a first sample signal corresponding to an interfering signal and desired signal received by the receiver antenna;

a third directional coupler, the third directional coupler being electrically coupled to the first directional coupler and having first and second outputs and respectively providing thereon first and second output signals each corresponding to the reference signal;

a first detector, the first detector being electrically coupled to the third directional coupler and providing a first detected output signal in response to the first output signal of the third directional coupler;

a synchronous detector, the synchronous detector having at least two inputs respectively electrically coupled to the third and second directional couplers and being responsive to the second output signal of the third coupler and the first sample signal of the second coupler, the synchronous detector comparing the third coupler second output signal and the first sample signal and providing at least one synchronous detector output signal in response thereto;

a signal controller, the signal controller having a first input electrically coupled to the first directional coupler and being responsive to the first output signal of the first coupler, and at least a second input electrically coupled to the synchronous detector, the signal controller having an output and providing thereon a cancellation signal in response to the synchronous detector output signal; and a subtractor, the subtractor being electrically coupled to the receiver transmission line and being further electrically coupled to the signal controller, the subtractor having an input on which is provided the cancellation signal, the subtractor effectively injecting the cancellation signal onto the receiver transmission line carrying the received interfering and desired signals, the cancellation signal injected into the receiver transmission line being equal in amplitude and opposite in phase to the interfering signal received by the receiver antenna and carried by the receiver transmission line so as to cancel the interfering signal on the receiver line;

a fourth directional coupler, the fourth directional coupler being electrically coupled to the receiver transmission line and electrically interposed between the receiver antenna and the subtractor, the fourth directional coupler having at least one output and providing thereon a second sample signal corresponding to the interfering signal and desired signal received by the receiver antenna;

a second detector, the second detector being electrically coupled to the fourth directional coupler and providing a second detected output signal in response to the second sample signal of the fourth directional coupler;

divider and comparator means, the divider and comparator means being provided with the first detected output signal of the first detector and with the second detected output signal of the second detector, the divider and comparator means dividing the second detected output signal with the first detected output signal and determining the ratio of the signal magnitudes thereof, and comparing the ratio with a predetermined value and providing an output signal in response to the comparison thereof; and switch means for coupling and decoupling at least a portion of the interference cancellation system from the radio receiver system, the switch means being electrically coupled to the divider and comparator means and being responsive to the output signal therefrom, the switch means including a first switch circuit, the first switch circuit being electrically coupled to the signal controller and to the subtractor and providing an electrical path between the signal controller and the subtractor in response to the output signal from the divider and comparator means.

4. An interference cancellation system for connection to a radio receiver system having a receiver antenna, a receiver and a receiver transmission line electrically coupling the receiver antenna to the receiver, the interference cancellation system comprising:

an auxiliary antenna for receiving an interfering signal, the auxiliary antenna providing a reference signal corresponding to the interfering signal received by the auxiliary antenna;

a first directional coupler, the reference signal being provided to the first directional coupler, the first directional coupler having first and second outputs and respectively providing thereon first and second output signals each corresponding to the reference signal;

a second directional coupler, the second directional coupler being electrically coupled to the receiver transmission line, the second directional coupler having an output and providing thereon a first sample signal corresponding to an interfering signal and desired signal received by the receiver antenna;

a third directional coupler, the third directional coupler being electrically coupled to the first directional coupler and having first and second outputs and respectively providing thereon first and second output signals each corresponding to the reference signal;

a first detector, the first detector being electrically coupled to the third directional coupler and providing a first detected output signal in response to the first output signal of the third directional coupler;

a synchronous detector, the synchronous detector having at least two inputs respectively electrically coupled to the third and second directional couplers and being responsive to the second output signal of the third coupler and the first sample signal of the second coupler, the synchronous detector comparing the third coupler second output signal and the first sample signal and providing at least one synchronous detector output signal in response thereto;

a signal controller, the signal controller having a first input electrically coupled to the first directional coupler and being responsive to the first output signal of the first coupler, and at least a second input electrically coupled to the synchronous detector, the signal controller having an output and providing thereon a cancellation signal in response to the synchronous detector output signal; and a subtractor, the subtractor being electrically coupled to the receiver transmission line and being further electrically coupled to the signal controller, the subtractor having an input on which is provided the cancellation signal, the subtractor effectively injecting the cancellation signal onto the receiver transmission line carrying the received interfering and desired signals, the cancellation signal injected into the receiver transmission line being equal in amplitude and opposite in phase to the interfering signal received by the receiver antenna and carried by the receiver transmission line so as to cancel the interfering signal on the receiver line;

a fourth directional coupler, the fourth directional coupler being electrically coupled to the receiver transmission line and electrically interposed between the receiver antenna and the subtractor, the fourth directional coupler having at least one output and providing thereon a second sample signal corresponding to the interfering signal and desired signal received by the receiver antenna;

a second detector, the second detector being electrically coupled to the fourth directional coupler and providing a second detected output signal in response to the second sample signal of the fourth directional coupler;

divider and comparator means, the divider and comparator means being provided with the first detected output signal of the first detector and with the second detected output signal of the second detector, the divider and comparator means dividing the second detected output signal with the first detected output signal and determining the ratio of the signal magnitudes thereof, and comparing the ratio with a predetermined value and providing an output signal in response to the comparison thereof; and switch means for coupling and decoupling at least a portion of the interference cancellation system from the radio receiver system, the switch means being electrically coupled to the divider and comparator means and being responsive to the output signal therefrom, the switch means including first and second switch circuits, the first switch circuit being electrically coupled to the receiver transmission line and electrically interposed between the receiver antenna and the subtractor, the second switch circuit being electrically coupled to the receiver transmission line and electrically interposed between the subtractor and the receiver, each of the first and second switch circuits being operable in at least first and second states in response to the output signal of the divider and comparator means, wherein the first and second switch circuits provide an electrical path from the receiver antenna to the receiver when the switch circuits are in the first state, thereby effectively decoupling the interference cancellation system from the radio receiver system, and wherein the first and second switch circuits provide an electrical path from the receiver antenna to the subtractor and from the subtractor to the radio receiver when the switch circuits are in the second state, thereby effectively coupling the interference cancellation system to the radio receiver system.

5. An interference cancellation system for connection to a radio receiver system having a receiver antenna, a receiver and a receiver transmission line electrically coupling the receiver antenna to the receiver, the interference cancellation system comprising:

an auxiliary antenna for receiving an interfering signal, the auxiliary antenna providing a reference signal corresponding to the interfering signal received by the auxiliary antenna;

a first directional coupler, the reference signal being provided to the first directional coupler, the first directional coupler having first and second outputs and respectively providing therein first and second output signals each corresponding to the reference signal;

a second directional coupler, the second directional coupler being electrically coupled to the receiver transmission line, the second directional coupler having an output and providing thereon a first sample signal corresponding to an interfering signal and desired signal received by the receiver antenna;

a synchronous detector, the synchronous detector having at least two inputs respectively electrically coupled to the first and second directional couplers and being responsive to the second output signal of the first coupler and the first sample signal of the second coupler, the synchronous detector comparing the first coupler second output signal and the sample signal and providing at least one synchronous detector output signal in response thereto;

a signal controller, the signal controller having a first input electrically coupled to the first directional coupler and being responsive to the first output signal of the first coupler, and at least a second input electrically coupled to the synchronous detector, the signal controller having an output and providing thereon a cancellation signal in response to the synchronous detector output signal;

a subtractor, the subtractor being electrically coupled to the receiver transmission line and being further electrically coupled to the signal controller, the subtractor having an input on which is provided the cancellation signal, the subtractor effectively injecting the cancellation signal onto the receiver transmission line carrying the received interfering and desired signals, the cancellation signal injected into the receiver transmission line being equal in amplitude and opposite in phase to the interfering signal received by the receiver antenna and carried by the receiver transmission line so as to cancel the interfering signal on the receiver transmission line;

a third directional coupler, the third directional coupler being electrically coupled to the receiver transmission line and electrically interposed between the receiver antenna and the subtractor, the third directional coupler having at least one output and providing thereon a second sample signal corresponding to the interfering signal and desired signal received by the receiver antenna;

a first detector, the first detector being electrically coupled to the third directional coupler and providing a first detected output signal in response to the second sample signal of the third directional coupler;

a comparator, the comparator being provided with the first detected output signal of the first detector and with a predetermined threshold signal, the comparator comparing the first detected output signal and the predetermined threshold signal and providing an output signal in response thereto; and switch means for coupling and decoupling at least a portion of the interference cancellation system from the radio receiver system, the switch means being electrically coupled to the comparator and being responsive to the output signal therefrom, the switch means including a first switch circuit, the first switch circuit being electrically coupled to the signal controller and to the subtractor and providing an electrical path between the signal controller and the subtractor in response to the output signal from the comparator.

6. An interference cancellation system for connection to a radio receiver system having a receiver antenna, a receiver and a receiver transmission line electrically coupling the receiver antenna to the receiver, the interference cancellation system comprising:

an auxiliary antenna for receiving an interfering signal, the auxiliary antenna providing a reference signal corresponding to the interfering signal received by the auxiliary antenna;

a first directional coupler, the reference signal being provided to the first directional coupler, the first directional coupler having first and second outputs and respectively providing therein first and second output signals each corresponding to the reference signal;

a second directional coupler, the second directional coupler being electrically coupled to the receiver transmission line, the second directional coupler having an output and providing thereon a first sample signal corresponding to an interfering signal and desired signal received by the receiver antenna;

a synchronous detector, the synchronous detector having at least two inputs respectively electrically coupled to the first and second directional couplers and being responsive to the second output signal of the first coupler and the first sample signal of the second coupler, the synchronous detector comparing the first coupler second output signal and the sample signal and providing at least one synchronous detector output signal in response thereto;

a signal controller, the signal controller having a first input electrically coupled to the first directional coupler and being responsive to the first output signal of the first coupler, and at least a second input electrically coupled to the synchronus detector, the signal controller having an output and providing thereon a cancellation signal in response to the synchronous detector output signal;

a subtractor, the subtractor being electrically coupled to the receiver transmission line and being further electrically coupled to the signal controller, the subtractor having an input on which is provided the cancellation signal, the subtractor effectively injecting the cancellation signal onto the receiver transmission line carrying the received interfering and desired signals, the cancellation signal injected into the receiver transmission line being equal in amplitude and opposite in phase to the interfering signal received by the receiver antenna and carried by the receiver transmission line so as to cancel the interfering signal on the receiver transmission line;

a third directional coupler, the third directional coupler being electrically coupled to the receiver transmission line and electrically interposed between the receiver antenna and the subtractor, the third directional coupler having at least one output and providing thereon a second sample signal corresponding to the interfering signal and desired signal received by the receiver antenna;

a first detector, the first detector being electrically coupled to the third directional coupler and providing a first detected output signal in response to the second sample signal of the third directional coupler;

a comparator, the comparator being provided with the first detected output signal of the first detector and with a predetermined threshold signal, the comparator comparing the first detected output signal and the predetermined threshold signal and providing an output signal in response thereto; and switch means for coupling and decoupling at least a portion of the interference cancellation system from the radio receiver system, the switch means being electrically coupled to the comparator and being responsive to the output signal therefrom, the switch means including first and second switch circuits, the first switch circuit being electrically coupled to the receiver transmission line and electrically interposed between the receiver antenna and the subtractor, the second switch circuit being electrically coupled to the receiver transmission line and electrically interposed between the subtractor and the receiver, each of the first and second switch circuits being operable in at least first and second states in response to the output signal of the comparator, wherein the first and second switch circuits provide an electrical path from the receiver antenna to the receiver when the switch circuits are in the first state, thereby effectively decoupling the interference cancellation system from the radio receiver system, and wherein the first and second switch circuits provide an electrical path from the receiver antenna to the subtractor and from the subtractor to the radio receiver when the switch circuits are in the second state, thereby effectively coupling the interference cancellation system to the radio receiver system.

* * * * *